US012775224B2

(12) United States Patent
Teramoto et al.

(10) Patent No.: US 12,775,224 B2
(45) Date of Patent: Oct. 27, 2026

(54) PRINT HEAD AND IMAGE FORMING APPARATUS

(71) Applicant: SHARP KABUSHIKI KAISHA, Sakai City (JP)

(72) Inventors: Akito Teramoto, Sakai City (JP); Kenzo Ohkubo, Sakai City (JP); Hiroshi Yamamoto, Sakai City (JP); Katsuaki Yamada, Sakai City (JP)

(73) Assignee: SHARP KABUSHIKI KAISHA, Sakai City (JP)

(*) Notice: Subject to any disclaimer, the term of this patent is extended or adjusted under 35 U.S.C. 154(b) by 0 days.

(21) Appl. No.: 19/221,763

(22) Filed: May 29, 2025

(65) Prior Publication Data

US 2025/0377607 A1 Dec. 11, 2025

(30) Foreign Application Priority Data

Jun. 10, 2024 (JP) ................................ 2024-093536

(51) Int. Cl.

*G03G 15/04* (2006.01)
*G03G 15/00* (2006.01)

(52) U.S. Cl.

CPC ... *G03G 15/04063* (2013.01); *G03G 15/0409* (2013.01); *G03G 15/80* (2013.01); *G03G 2215/0412* (2013.01)

(58) Field of Classification Search

CPC ....... G03G 15/04054; G03G 15/04063; G03G 15/0409; G03G 15/80; G03G 2215/0412

See application file for complete search history.

(56) References Cited

U.S. PATENT DOCUMENTS

| | | | | |
|---|---|---|---|---|
| 10,656,594 | B2 * | 5/2020 | Iwai | G03G 21/185 |
| 10,747,137 | B2 * | 8/2020 | Ishidate | G03G 21/1666 |
| 2025/0284220 | A1 * | 9/2025 | Ueda | G03G 15/0409 |

FOREIGN PATENT DOCUMENTS

JP 2007-127808 A 5/2007

* cited by examiner

*Primary Examiner* — Hoang X Ngo

(74) *Attorney, Agent, or Firm* — ScienBiziP, P.C.

(57) ABSTRACT

A print head 3 includes: a light-emitting element substrate 311 having a plurality of light-emitting elements 31-31 arranged in a line; a lens array 32 that focuses light emitted from the plurality of light-emitting elements 31-31 onto an image carrier (1); and a support member 316 that supports the light-emitting element substrate 311, and a film-like protruding portion 317 protrudes from the support member 316. The support member 316 is provided with a space SP having an opening SPa opened to the outside. The protruding portion 317 is disposed in a state of being bent from the opening SPa of the space SP into the space SP.

12 Claims, 13 Drawing Sheets

PRINT HEAD AND IMAGE FORMING APPARATUS

CROSS-REFERENCE TO RELATED APPLICATIONS

The present application claims priority from Japanese Application JP 2024-093536, the content to which is hereby incorporated by reference into this application.

BACKGROUND OF THE INVENTION

1. Field of the Invention

The present disclosure relates to a print head and an image forming apparatus such as a copier, a multifunction peripheral, a printer, and a facsimile machine.

2. Description of the Related Art

In recent years, image forming apparatuses such as a copier, a multifunction peripheral, a printer, and a facsimile machine have been required to be downsized.

SUMMARY OF THE INVENTION

As a print head included in an image forming apparatus, a print head is conventionally known which includes: a light-emitting element substrate having a plurality of light-emitting elements arranged in a line; a lens array that focuses light emitted from the plurality of light-emitting elements on an image carrier (for example, a photosensitive drum); and a support member for supporting the light-emitting element substrate, and in which a film-like protruding portion protrudes from the support member.

Specifically, a conventional LED head (print head) includes: a first substrate (light-emitting element substrate) having an LED array (a plurality of light-emitting elements); a lens array; and a substrate support portion (support member), and a flexible wiring board (film-like protruding portion) protrudes from the substrate support portion.

In such a print head, a film-like protruding portion (for example, a film-like light-emitting element panel and/or a connection cable member) protruding from the support member is disposed along an outer surface of the support member. For this reason, in a case where it is necessary to secure a length of the protruding portion to some extent, there is a limit in reducing a size of the support member, which leads to an increase in size of the print head. In addition, since the entire protruding portion is exposed to the outside from the outer surface of the support member, the protruding portion is more likely to be damaged by interference from outside.

Therefore, an object of the present disclosure is to provide a print head and an image forming apparatus that are capable of achieving miniaturization of the print head in a state in which a length of a film-like protruding portion protruding from a support member is secured, and capable of reducing an opportunity of damaging the protruding portion due to interference from the outside.

In order to solve the above problem, a print head according to an aspect of the present disclosure is characterized by including: a light-emitting element substrate having a plurality of light-emitting elements arranged in a line; a lens array that focuses light emitted from the plurality of light-emitting elements on an image carrier; and a support member that supports the light-emitting element substrate, and is further characterized in that a film-like protruding portion protrudes from the support member, the support member is provided with a space having an opening opened to the outside, and the protruding portion is disposed in a state of being bent from the opening of the space into the space.

Further, an image forming apparatus according to an aspect of the present disclosure includes the print head according to the present disclosure.

According to the present disclosure, it is possible to achieve miniaturization of a print head in a state in which the length of a film-like protruding portion that protrudes from a support member is secured, and it is also possible to reduce the opportunity for the protruding portion to be damaged by interference from the outside.

DETAILED DESCRIPTION OF THE INVENTION

Embodiments according to an aspect of the present disclosure will be described below with reference to the drawings. In the following description, the same components are denoted by the same reference signs. Names and functions of the same components are also identical. Therefore, detailed descriptions thereof will not be repeated.

Image Forming Apparatus

Figure 1:
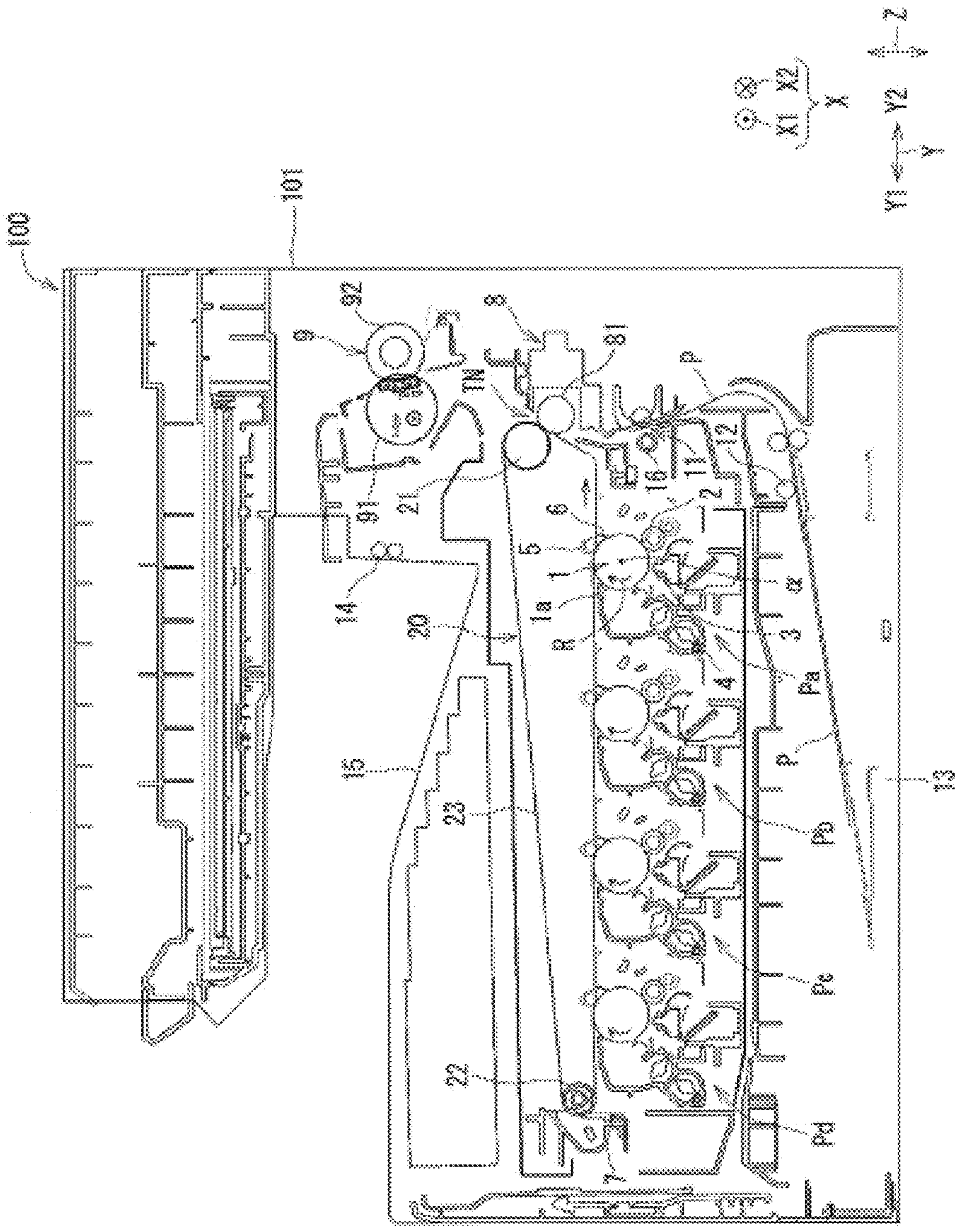
FIG. 1 is a cross-sectional view illustrating an image forming apparatus according to the present embodiment.

FIG. 1 is a cross-sectional view illustrating an image forming apparatus 100 according to the present embodiment. In the drawings, hereinafter, X is a rotation axis direction of a photosensitive drum 1, X1 is a front side, X2 is a back side, Y is a left-right direction perpendicular to the rotation axis direction X, Y1 is a right side, Y2 is a left side, and Z is an up-down direction perpendicular to the rotation axis direction X and the left-right direction Y.

Image data processed in an image forming apparatus main body 101 of the image forming apparatus 100 corresponds to a color image using colors including black (K), cyan (C), magenta (M), and yellow (Y), or a monochrome image using a single color (for example, black). Thus, four of each of the photosensitive drum 1 (an image carrier), a charger 2, a print head 3, a developing device 4, a primary transfer device 5, and a drum cleaning device 6 are provided in order to form four types of toner images corresponding to colors, and four image stations Pa, Pb, Pc, and Pd are formed, each corresponding to black, cyan, magenta, and yellow. It is noted that the image forming apparatus 100 may be a monochrome image forming apparatus.

In each of the image stations Pa, Pb, Pc, and Pd, the chargers 2-2 uniformly charge surfaces 1*a* of the photosensitive drums 1-1 driven to rotate in a predetermined rotation direction R, to a predetermined potential. The print heads 3-3 expose the surfaces 1*a* of the photosensitive drums 1-1 to form electrostatic latent images on the surfaces 1*a* of the photosensitive drums 1-1. The developing device 4 develops the electrostatic latent images on the surfaces 1*a* of the photosensitive drums 1-1, and forms a toner image on the surfaces 1*a* of the photosensitive drums 1-1. As a result, the toner image of each color is formed on the surface 1*a* of each of the photosensitive drums 1-1. The drum cleaning devices 6-6 remove and collect residual toner from the surfaces 1*a* of the photosensitive drums 1-1. The primary transfer devices 5-5 sequentially superimpose and transfer the toner images of the colors on the surface 1*a* of each of the photosensitive drums 1-1 onto an intermediate transfer belt 23 making a revolving motion by means of a drive roller 21 and a driven roller 22 in a belt drive device 20, thereby forming a color toner image on the intermediate transfer belt 23. A belt cleaning device 7 removes and collects a residual toner from the intermediate transfer belt 23.

A transfer nip portion TN is formed between the intermediate transfer belt 23 and a transfer roller 81 of a secondary transfer device 8. The transfer roller 81 of the secondary transfer device 8 transfers the color toner image on the surface of the intermediate transfer belt 23 onto a sheet P, such as a recording sheet conveyed through a sheet conveyance path 11, while sandwiching the sheet P in the transfer nip portion TN and conveying the sheet P together with the intermediate transfer belt 23. A fusing device 9 fuses the color toner image on the sheet P by sandwiching the sheet P between a fusing member (in this example, a fusing belt 91) and a pressure member (in this example, a pressure roller 92) and applying heat and pressure to the sheet P.

The sheet P is pulled out from a paper feed cassette 13 by a pickup roller 12, conveyed through the sheet conveyance path 11, passes through the secondary transfer device 8 and the fusing device 9, and is discharged to a discharge tray 15 via a discharge roller 14. In the sheet conveyance path 11, a registration roller 16 and the like are disposed. The registration roller 16 temporarily stops the sheet P, aligns the leading edges of the sheet P, and then starts conveying the sheet P in accordance with a timing of transferring the toner image at the transfer nip portion TN between the intermediate transfer belt 23 and the transfer roller 81.

Figure 2:
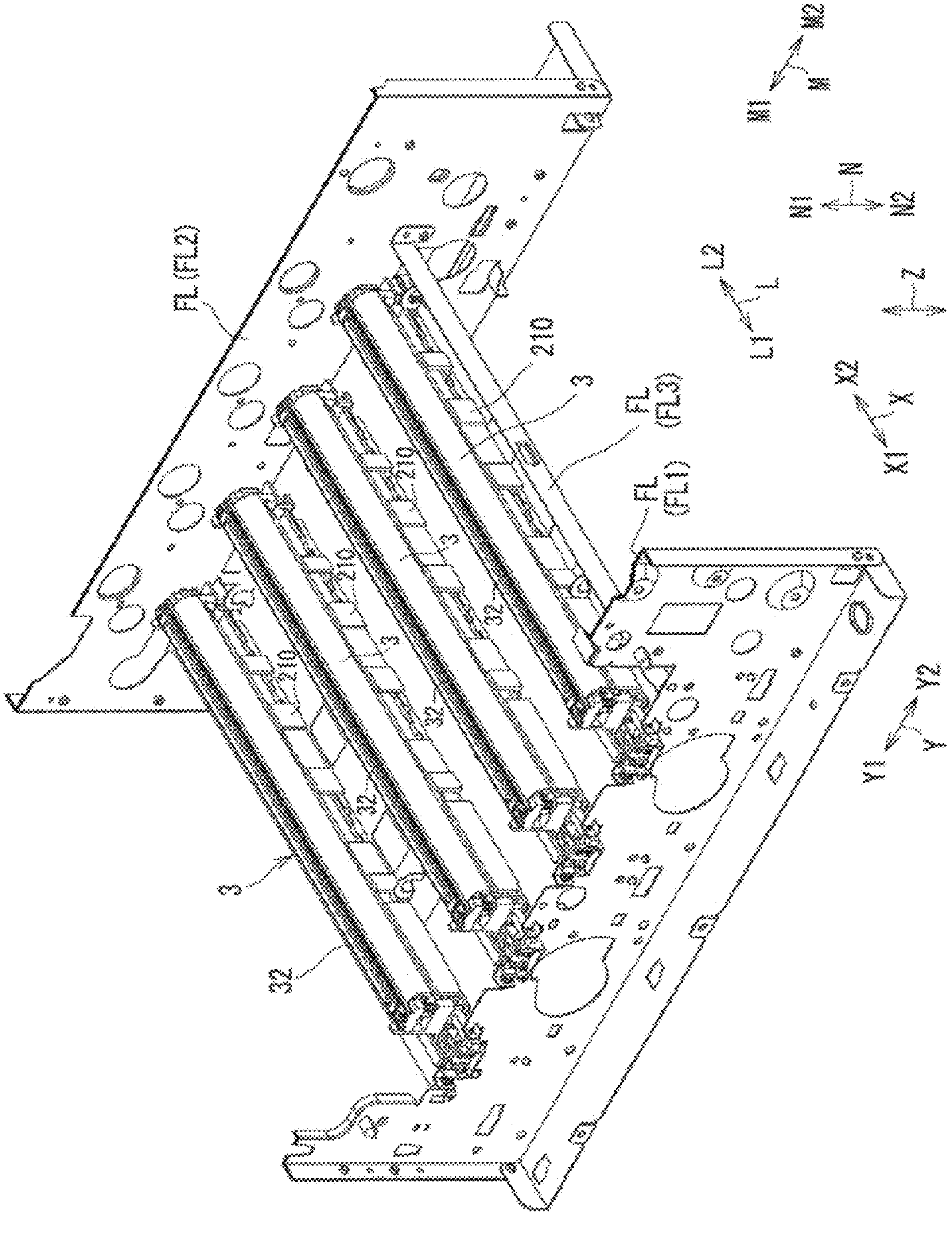
FIG. 2 is a perspective view of an example of print heads in the image forming apparatus according to the present embodiment in a state of being provided on a main body frame, as viewed obliquely from above on a front side.
Figure 3:
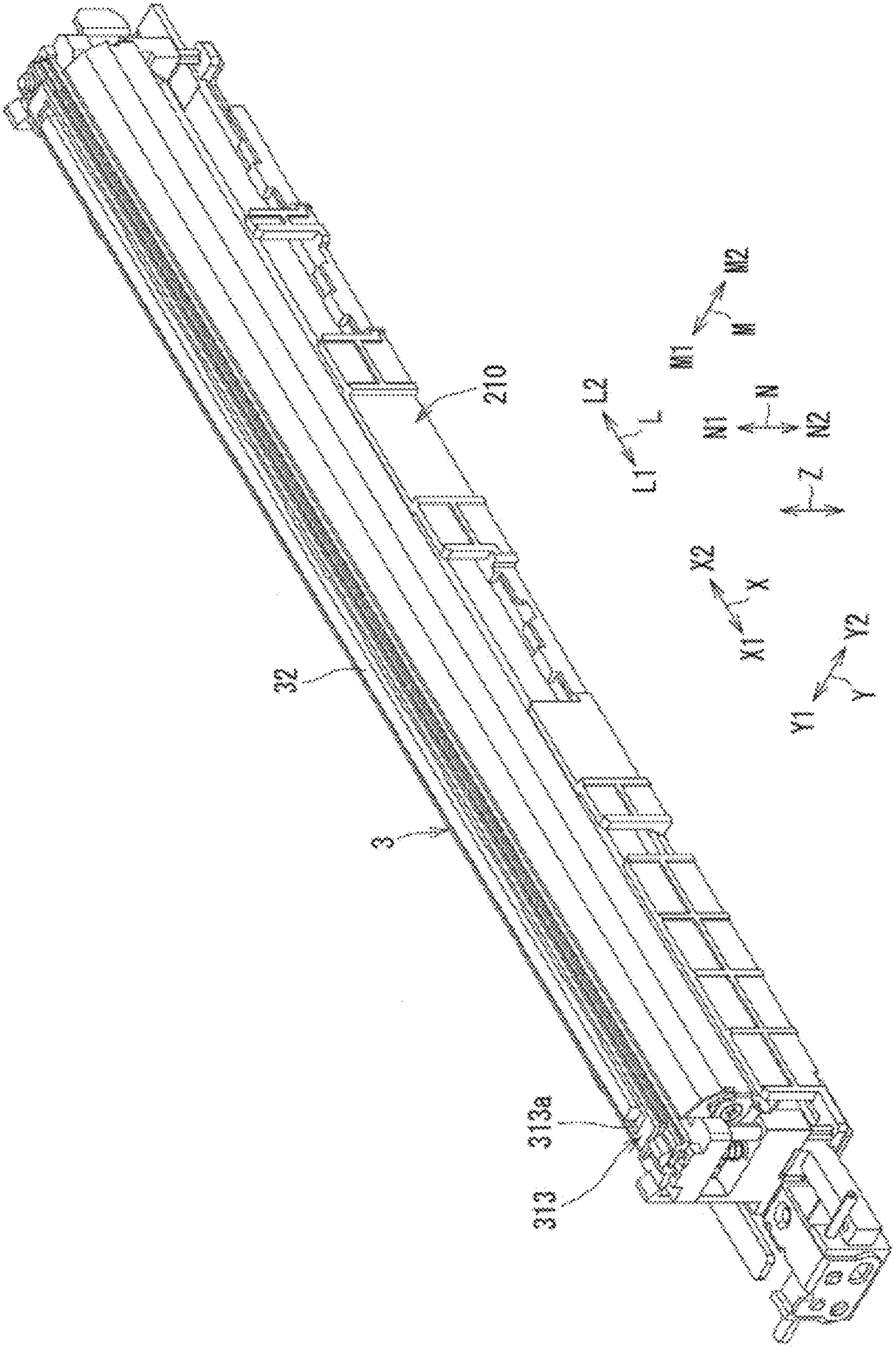
FIG. 3 is a perspective view of a state in which the print head illustrated in FIG. 2 is supported by a bridging portion, as viewed obliquely from above on the front side.
Figure 4:
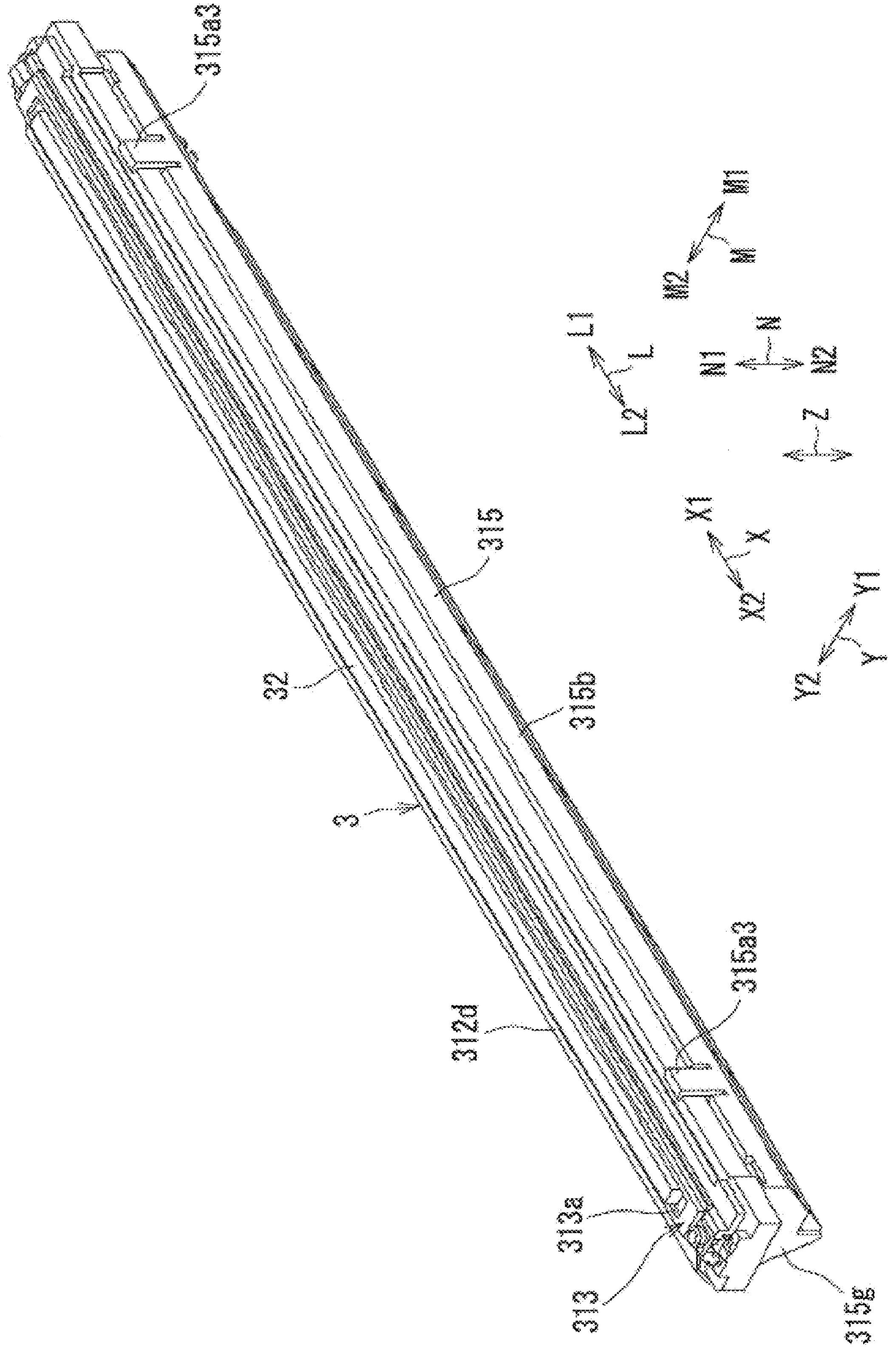
FIG. 4 is a perspective view of a print head as viewed obliquely from above on a back side.
Figure 5:
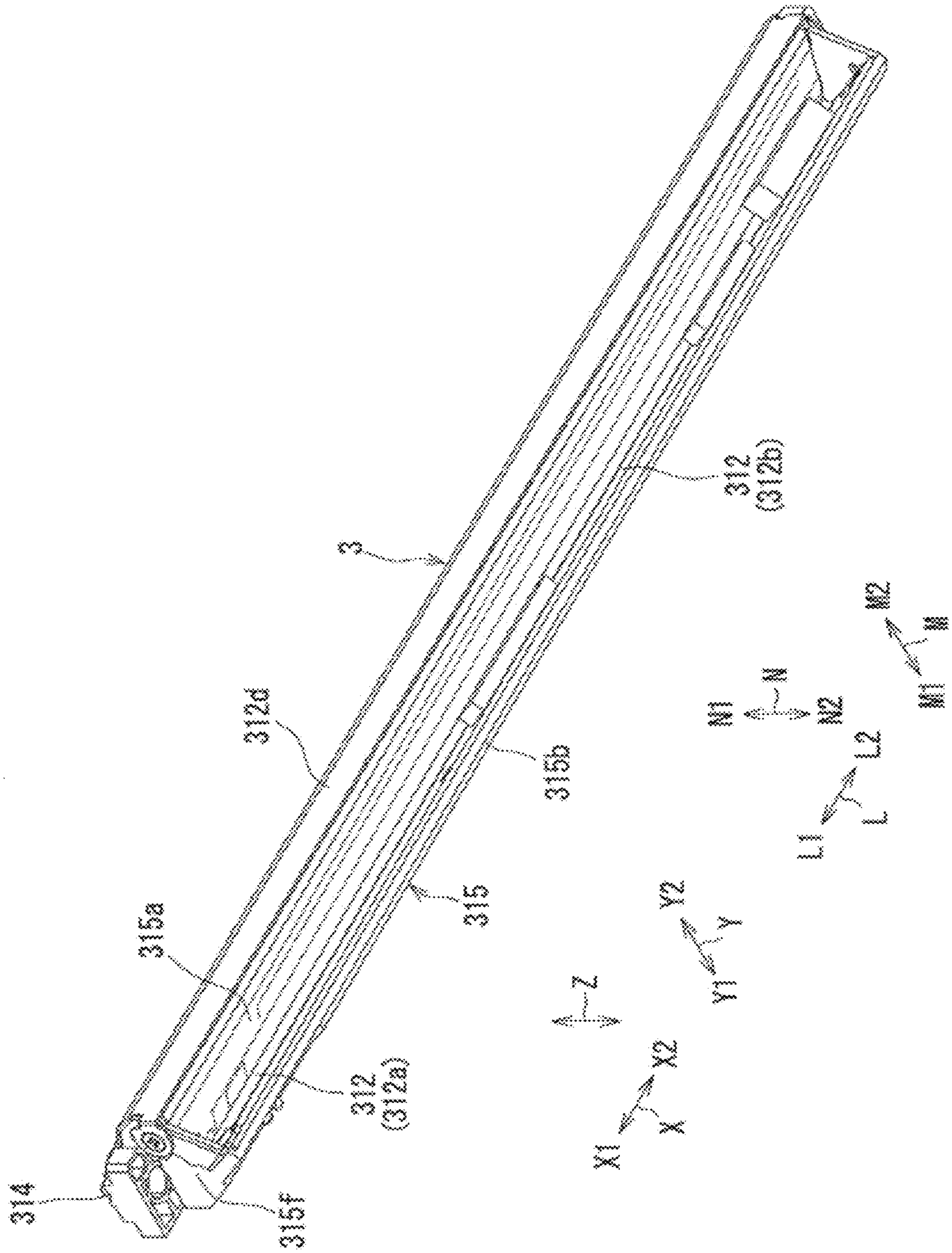
FIG. 5 is a perspective view of the print head illustrated in FIG. 4 as viewed obliquely from below on the front side.
Figure 6:
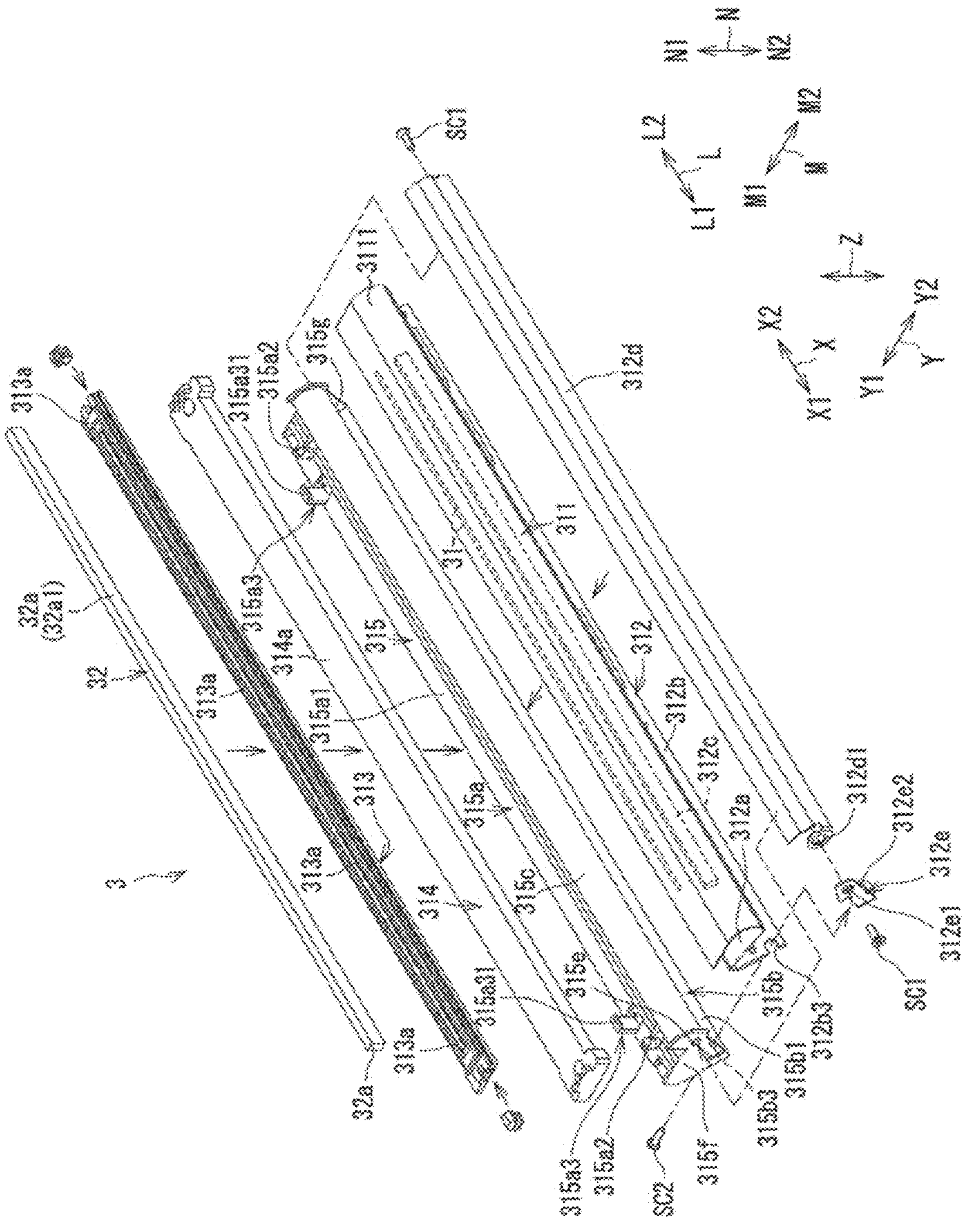
FIG. 6 is an exploded perspective view of the print head illustrated in FIG. 4 as viewed obliquely from above on the front side.
Figure 7:
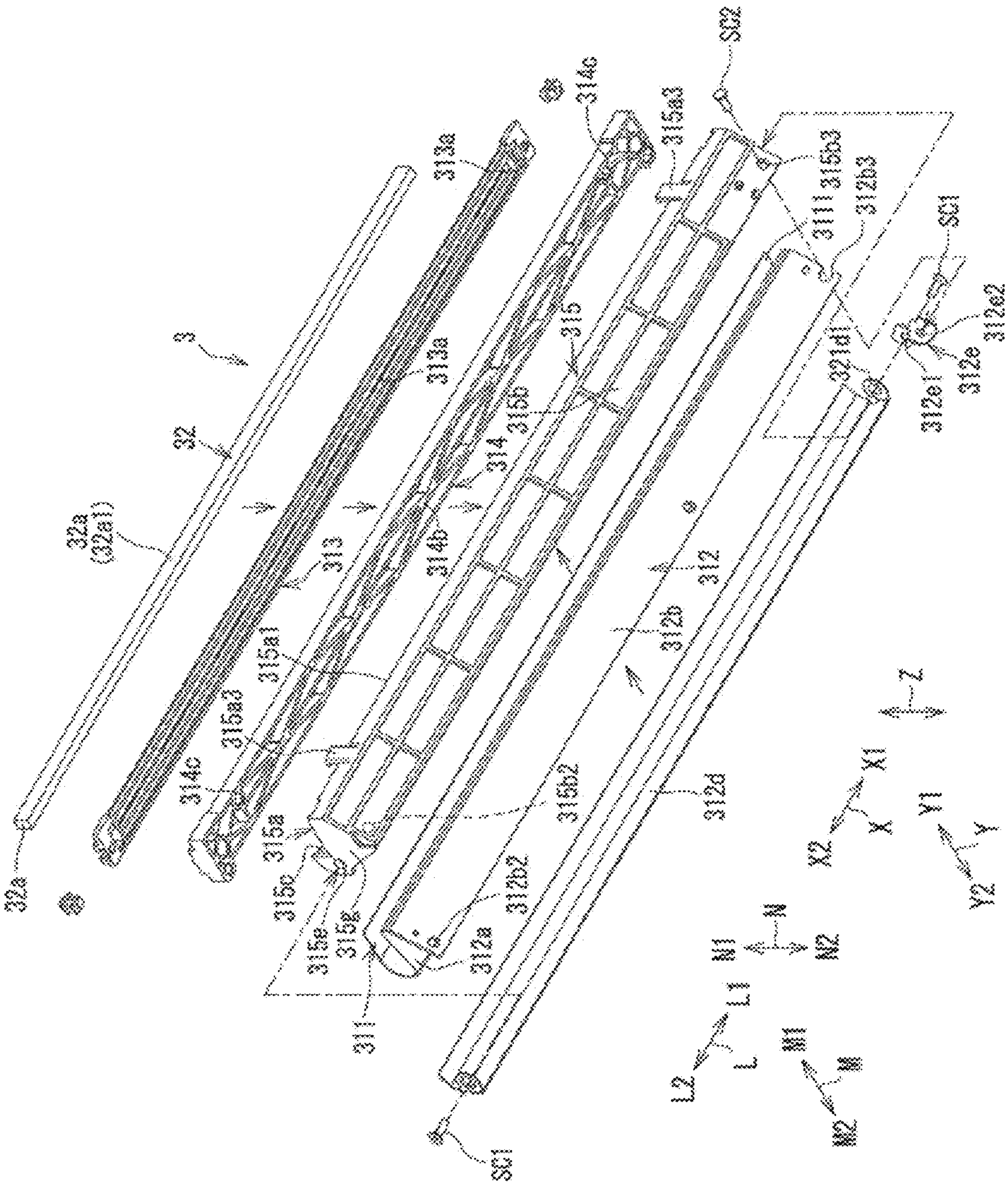
FIG. 7 is an exploded perspective view of the print head illustrated in FIG. 4 as viewed obliquely from below on the back side.

FIG. 2 is a perspective view of an example of the print heads 3-3 in the image forming apparatus 100 according to the present embodiment in a state where the print heads 3-3 are provided on main body frames FL (FL1-FL3), as viewed obliquely from above on a front side X1. FIG. 3 is a perspective view of a state in which the print head 3 illustrated in FIG. 2 is supported by a bridging portion 210, as viewed obliquely from above on the front side X1. FIG. 4 is a perspective view of the print head 3 as viewed obliquely from above on a back side X2. FIG. 5 is a perspective view of the print head 3 illustrated in FIG. 4 as viewed obliquely from below on the front side X1. FIGS. 6 and 7 are exploded perspective views of the print head 3 illustrated in FIG. 4, as viewed obliquely from above on the front side X1 and obliquely from below on the back side X2, respectively.

Figure 8:
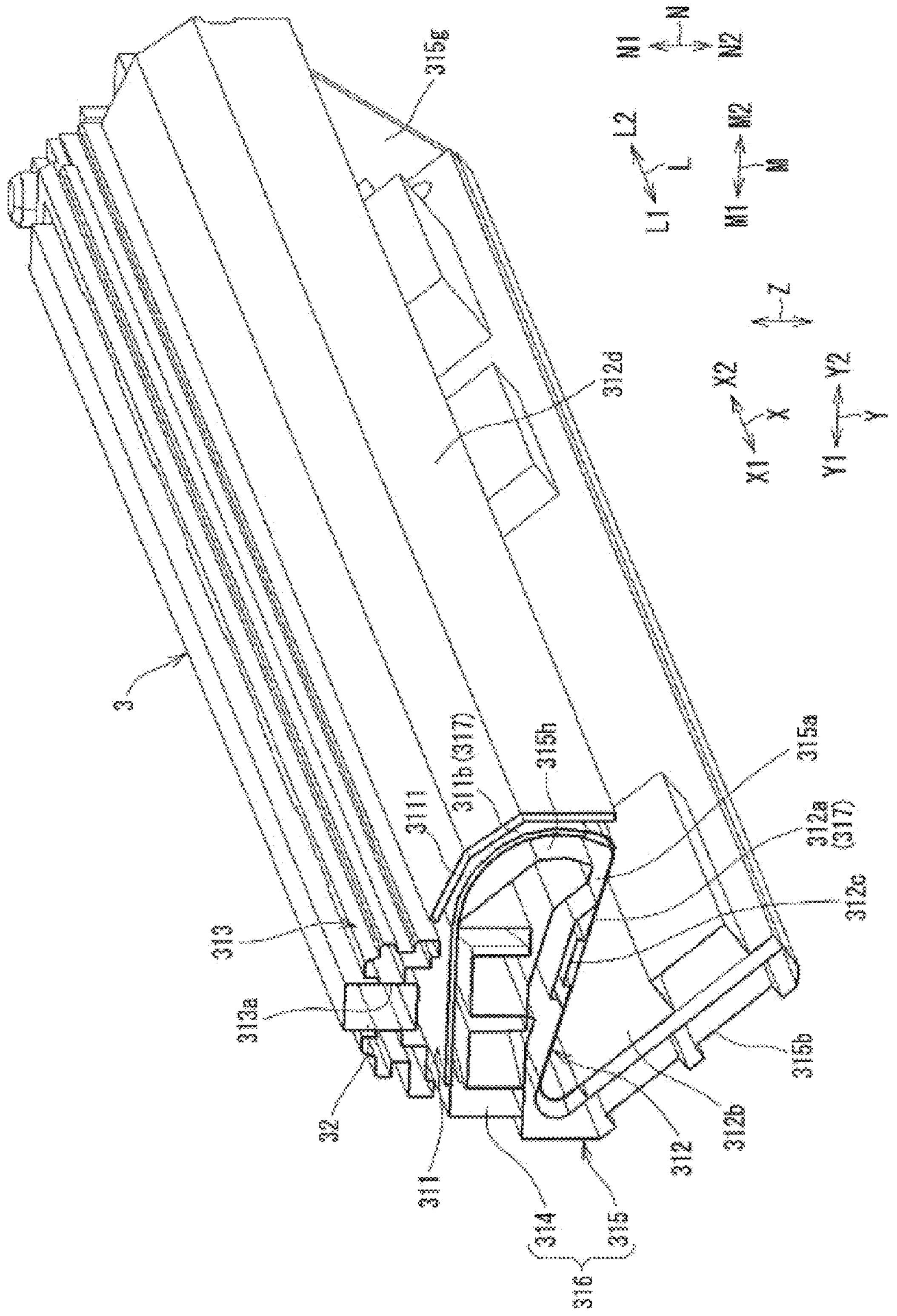
FIG. 8 is a cross-sectional perspective view of the print head as viewed obliquely from above on the front side.
Figure 9:
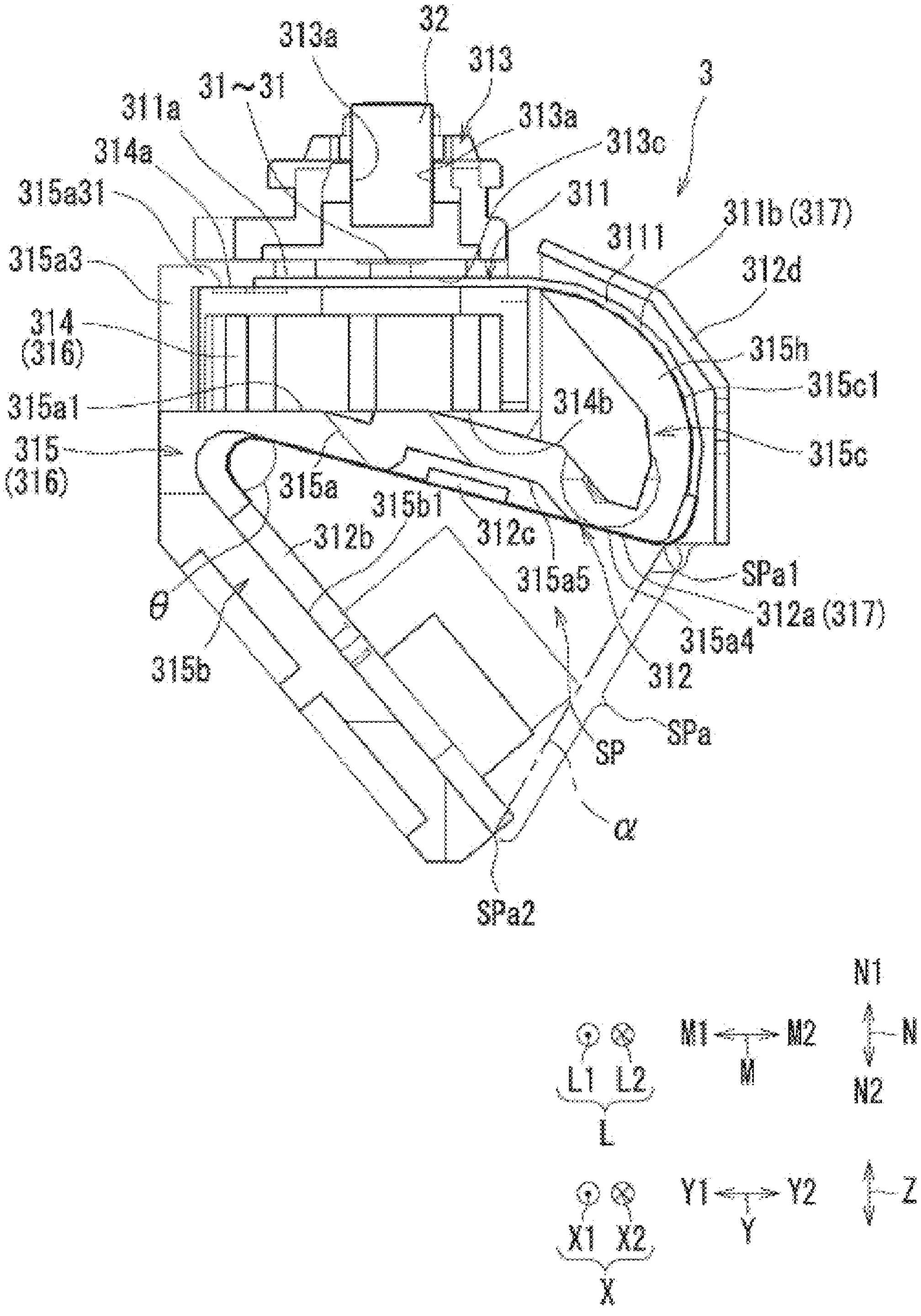
FIG. 9 is a cross-sectional view of the print head.
Figure 10:
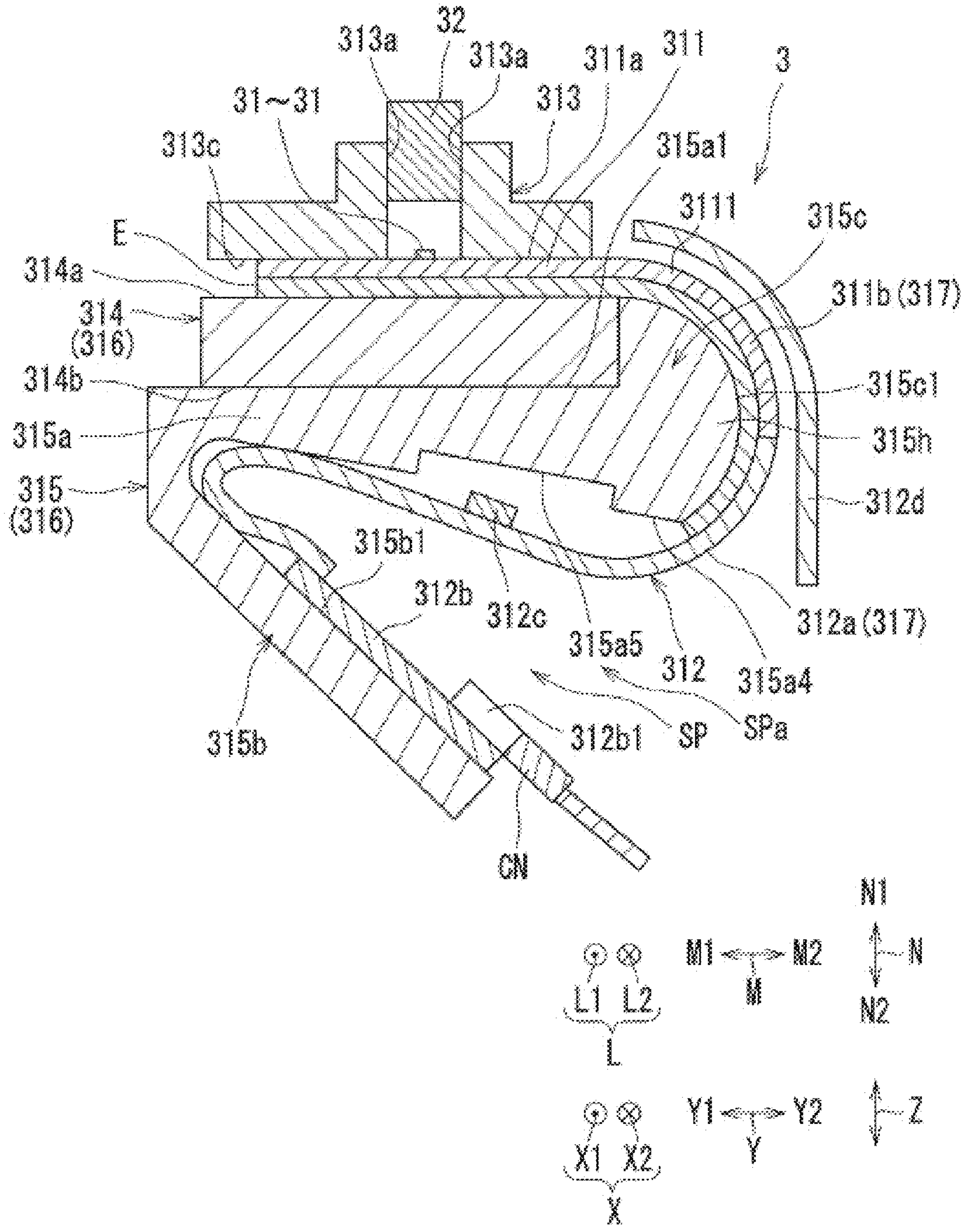
FIG. 10 is a schematic view illustrating the cross-sectional view illustrated in FIG. 9 for easy understanding.
Figure 11:
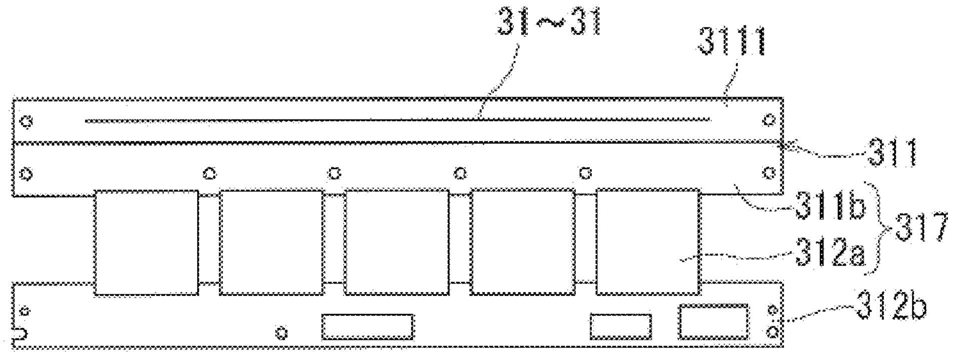
FIG. 11 is a plan view illustrating a state in which a flexible circuit board is linearly extended in a light-emitting element substrate, the flexible circuit board, and a printed wiring board that constitute a print head.

FIG. 8 is a cross-sectional perspective view of the print head 3 as viewed obliquely from above on the front side. FIG. 9 is a cross-sectional view of the print head 3. FIG. 10 is a schematic view illustrating the cross-sectional view illustrated in FIG. 9 for easy understanding. FIG. 11 is a plan view illustrating a state in which a flexible circuit board 312*a* is linearly extended in a light-emitting element substrate 311, the flexible circuit board 312*a*, and a printed wiring board 312*b* that constitute the print head 3.

In the following description, a plurality of light-emitting elements 31-31 in the print heads 3-3 will be described as organic EL diodes (OLED: Organic Light-Emitting Diode, hereinafter simply referred to as OLEDs). The light-emitting elements 31-31 are not limited to OLEDs, but may be light-emitting elements such as inorganic light-emitting diodes (LEDs) or, for example, nano-light-emitting diodes (nanoscale light-emitting diodes), which are light-emitting diodes (LEDs) having a size smaller than a micrometer.

Since the print heads 3-3 and the like have the same configuration, they are illustrated in one drawing in FIGS. 3 to 11, and in the following description, the print heads 3-3 and the like are simply referred to as the print head 3 and the like.

The image forming apparatus 100 according to the present embodiment includes the photosensitive drum 1 and the print head 3 having a long length. The print head 3 includes the light-emitting element substrate 311 and a lens array 32. The light-emitting element substrate 311 has a plurality of light-emitting elements 31-31 (see FIGS. 9 to 11). The light-emitting elements 31-31 emit light for exposing the surface 1*a* of the photosensitive drum 1. The light-emitting elements 31-31 are arranged next to each other and in a line in a longitudinal direction L of the print head 3. In such an example, the light-emitting element substrate 311 is a film-like substrate (flexible OLED panel) (light-emitting element panel) mounted with OLED elements (31-31). This makes it possible to achieve miniaturization and cost reduction of the print head 3.

The lens array 32 extends in the longitudinal direction L and focuses light emitted by the light-emitting elements 31-31 onto the surface 1*a* of the photosensitive drum 1. The lens array 32 is disposed to face the light-emitting elements 31-31.

The print head 3 is provided on the bridging portion 210. The bridging portion 210 is bridged between the main body frames FL of the image forming apparatus main body 101

(see FIG. 1) (in this example, between the main body frame FL1 on the front side X1 and a main body frame FL2 on the back side X2).

In this example, between the main body frames FL1, FL2, the main body frame FL3 is bridged along the rotation axis direction X and the left-right direction Y. The bridging portion 210 is mounted on the main body frame FL3.

Print Head

As illustrated in FIGS. 8 to 11, the print head 3 further includes a driving member 312, a lens holding member 313, a fixing member 314 (base member), and a main body member 315. The fixing member 314 and the main body member 315 constitute a support member 316. The driving member 312 drives the light-emitting elements 31-31. The lens holding member 313 holds the lens array 32. The fixing member 314 fixes the lens holding member 313 in a state where a light-emitting element panel (311) is fixed. The main body member 315 holds the driving member 312, the lens holding member 313, and the fixing member 314.

In this example, the driving member 312 includes a flexible circuit board 312*a* (connection cable member), a printed wiring board 312*b* (PWB) (connection substrate), a driving circuit element 312*c*, and a protective member 312*d*. One end portion of the connection cable member (312*a*) is connected to one end portion of the light-emitting element panel (311), and an other end portion thereof is connected to one end portion of the printed wiring board 312*b*. The connection cable member (312*a*) is a flexible circuit board (COF: Chip on Film) in which the driving circuit element 312*c* (driver IC) for driving the OLED elements (31-31) on the light-emitting element panel (311) is mounted on a film. The printed wiring board 312*b* connected to the connection cable member (312*a*) has an input terminal 312*b*1 (see FIG. 10) (connector terminal), and is connected to a connector CN (see FIG. 10) via the input terminal 312*b*1. The protective member 312*d* protects the light-emitting element panel (311) and an exposed portion of the connection cable member (312*a*). The connector CN is connected to an image processing device (not illustrated) provided in the image forming apparatus main body 101. In FIG. 10, the light-emitting elements 31-31 are provided to protrude from the outer surface of the light-emitting element panel (311), but this is for the purpose of illustrating the light-emitting elements 31-31 for easy understanding, and actually, as illustrated in FIG. 9, the light-emitting elements 31-31 are provided (for example, deposited) inside the light-emitting element panel (311) so as not to project from the outer surface thereof.

The lens holding member 313 is a frame-shaped member surrounding outer peripheral surfaces 32*a*-32*a* (see FIGS. 6 and 7) of the lens array 32 along an optical axis direction N of the light-emitting elements 31-31. Herein, the optical axis direction Nis a direction (thickness direction) perpendicular to both the longitudinal direction L and a width direction M of the print head 3. The lens array 32 is inserted into an inner side surface 313*a* of the lens holding member 313 that is a frame-shaped member. The lens array 32 includes at least a part of the outer peripheral surfaces 32*a*-32*a* (in this example, side surfaces 32*a*1, 32*al* along the longitudinal direction L) held by the lens holding member 313, and the outer peripheral surfaces 32*a*-32*a* are bonded at least at some locations (in this example, a plurality of locations) with an adhesive (for example, an ultraviolet curing adhesive). Further, a periphery of a joint between the lens array 32 and the lens holding member 313 is sealed with a caulking agent (caulking resin). This effectively makes it possible to prevent foreign matter such as dust from entering the lens holding member 313 through the joint between the lens array 32 and the lens holding member 313.

The fixing member 314 is formed in a rectangular parallelepiped shape. A rear surface of the light-emitting element substrate 311 (light-emitting element panel provided with the light-emitting elements 31-31) opposite to the light-emitting elements 31-31 is bonded to a surface 314*a* of the fixing member 314 on a side of the photosensitive drum 1 (one side N1) in the optical axis direction N by an adhesive member E (for example, a double-sided adhesive tape) (see FIG. 10). A rear surface 313*c* of the lens holding member 313 is fixed to a substrate surface 311*a* (panel surface) of the light-emitting element substrate 311 (light-emitting element panel provided with the light-emitting elements 31-31) opposite to the fixing member 314. The area surrounding a joint between the lens holding member 313 and the light-emitting element substrate 311 (light-emitting element panel provided with the light-emitting elements 31-31) is sealed with a caulking agent (caulking resin). This effectively makes it possible to prevent foreign matter such as dust from entering the lens holding member 313 through the joint between the lens holding member 313 and the light-emitting element substrate 311 (light-emitting element panel provided with the light-emitting elements 31-31).

Relative positions (positions in the longitudinal direction L, in the width direction M, and in the optical axis direction N) of the plurality of light-emitting elements 31-31 and the lens array 32 are positioned and adjusted in advance by using a jig or the like in a production process.

The main body member 315 includes a placement portion 315*a*, a bent portion 315*b*, and a substrate guide portion 315*c*. The placement portion 315*a*, the bent portion 315*b*, and the substrate guide portion 315*c* are integrally formed.

The fixing member 314 is disposed in the placement portion 315*a*. The placement portion 315*a* is provided with a placement surface 315*al* on which the fixing member 314 is disposed in such a way that a rear surface 314*b* of the fixing member 314 on a side of the bridging portion 210 comes into contact with the placement surface 315*al*. This allows the fixing member 314 to be reliably disposed on the placement surface 315*al* of the placement portion 315*a*. A plurality of (two) positioning protrusions or recesses (positioning protrusions 315*a*2, 315*a*2 in this example) (see FIG. 6) are provided on the placement surface 315*al* of the placement portion 315*a*. The rear surface 314*b* of the fixing member 314 is provided with positioning recesses or protrusions (positioning recesses 314*c*, 314*c* in this example) (see FIG. 7) corresponding to the plurality of (two) positioning protrusions or recesses (315*a*2, 315*a*2). This allows the fixing member 314 to be reliably positioned relative to the main body member 315. The placement portion 315*a* is provided with a plurality of (two) holding portions 315*a*3, 315*a*3 (see FIGS. 6, 7, and 9). The placement portion 315*a* and the holding portions 315*a*3, 315*a*3 are integrally formed. The holding portions 315*a*3, 315*a*3 detachably hold the fixing member 314 on the placement portion 315*a*. The holding portion 315*a*3, 315*a*3 restrict movement of the fixing member 314 towards the light-emitting elements 31-31 in the optical axis direction N (one side N1). The holding portions 315*a*3, 315*a*3 includes a locker 315*a*31 (see FIG. 9) that locks the surface 314*a* of the fixing member 314.

The bent portion 315*b* is bent at an acute angle (for example, 60 degrees or less, about 50 degrees in this example) relative to the placement portion 315*a*. The printed wiring board 312*b* is fixed to a surface 315*b*1 (inner side surface) of the bent portion 315*b* facing the placement portion 315*a*. The input terminal 312*b*1 is provided at an entrance side (opening Spa side) end portion of a space SP between the placement portion 315*a* and the bent portion 315*b* of the printed wiring board 312*b*, and the connector CN is connected toward the space SP.

The substrate guide portion 315*c* has a curved portion 315*c*1 that folds back the film-like protruding portion 317 from the support member 316 (314, 315) toward the space SP. The curved portion 315*c*1 is curved in such a way that the protruding portion 317 on a side of the lens holding member 313 is folded back by 180 degrees or more [in this example, between the light-emitting element panel (311) and the connection cable member (312*a*)]. The curved portion 315*c*1 projects to one side (in this example, an other side M2) in the width direction M from the lens holding member 313. A panel portion 311*b* of the light-emitting element panel (311) on a side of the connection cable member (312*a*) and a portion of the connection cable member (312*a*) on a side of the light-emitting element panel (311) are bonded to the curved portion 315*c*1 with an adhesive member E. Accordingly, the curved portion 315*c*1 can reliably fold back the protruding portion 317 [in this example, the connection cable member (312*a*)] into the space SP. The protective member 312*d* faces a portion corresponding to the curved portion 315*c*1 of the protruding portion 317, and is curved along the curved portion 315*c*1. As illustrated in FIGS. 6 and 7, a fastening member SC1 (male screw) inserts through a through hole 312*e*1 of a retainer 312*e* and a through hole 312*d*1 of the protective member 312*d* on one side L1 in the longitudinal direction L of the protective member 312*d* so that the protective member 312*d* is fastened to a fastened portion 315*e* (female screw) of the main body member 315. This allows the end portion of the protective member 312*d* on the one side L1 in the longitudinal direction L to be fixed to the main body member 315.

The fastening member SC1 inserts through the through hole 312*d*1 of the protective member 312*d* on an other side L2 in the longitudinal direction L so that the protective member 312*d* is fastened to the fastened portion 315*e* of the main body member 315. This allows the end portion of the protective member 312*d* on the other side L2 in the longitudinal direction L to be fixed to the main body member 315. In the printed wiring board 312*b*, a positioning hole 312*b*2 of the printed wiring board 312*b* is positioned by the positioning protrusion 315*b*2 of the bent portion 315*b* on the other side L2 in the longitudinal direction L. In such a state, a fastening member SC2 (male screw) inserts through a through hole 315*b*3 of the bent portion 315*b* and a through recess 312*b*3 of the printed wiring board 312*b* on the one side L1 in the longitudinal direction L so that the printed wiring board 312*b* is fastened to a fastened portion 312*e*2 (female screw) of the retainer 312*e*. This allows the protective member 312*d* to be held in a state where the protective member 312*d* is positioned at the bent portion 315*b*.

An end portion of a part [connection cable member (312*a*)] of the protruding portion 317 provided in the space SP on a side of the printed wiring board 312*b* is folded back at a corner portion between the placement portion 315*a* and the bent portion 315*b*, and is connected to the printed wiring board 312*b*.

The driving circuit element 312*c* is provided on a side of the placement portion 315*a* of the connection cable member (312*a*). A recessed portion 315*a*5 for preventing interference of the connection cable member (312*a*) with the driving circuit element 312*c* is provided on a surface 315*a*4 recess portion (inner side surface) of the placement portion 315*a* facing the bent portion 315*b*.

The main body member 315 is provided with a pair of side plates 315*f*, 315*g* (see FIGS. 6 and 7) closing both ends of the space SP in the longitudinal direction L.

Next, a method of manufacturing the print head 3 will be described below with reference to FIGS. 12 to 17.

FIGS. 12 to 17 are perspective views for describing examples of first to sixth steps of a manufacturing process of the print head 3, respectively. It is noted that FIGS. 12 to 17 illustrate the steps of providing the lens array 32 on the lens holding member 313, providing the light-emitting element panel (311) on the fixing member 314, and providing the lens holding member 313 on the light-emitting element panel (311).

Figure 12:
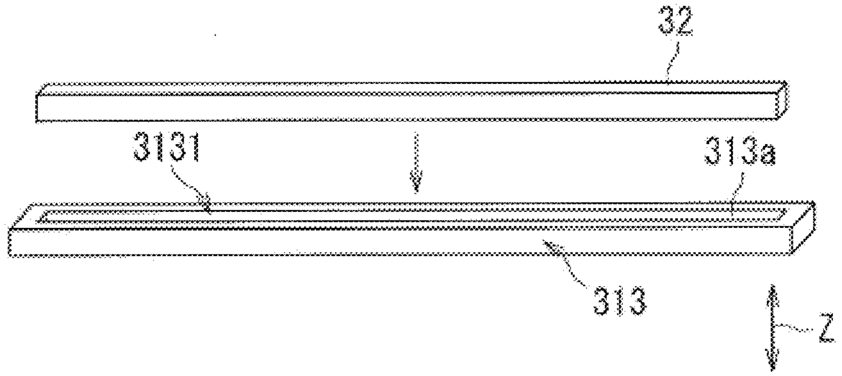
FIG. 12 is a perspective view for explaining an example of a first step of a manufacturing process of the print head.

In the method of manufacturing the print head 3, first, as illustrated in FIG. 12, the lens array 32 is inserted into the inner side surface (313*a*) of the lens holding member 313 (in this example, a long through-hole 3131 along the up-down direction Z) (first step).

Figure 13:
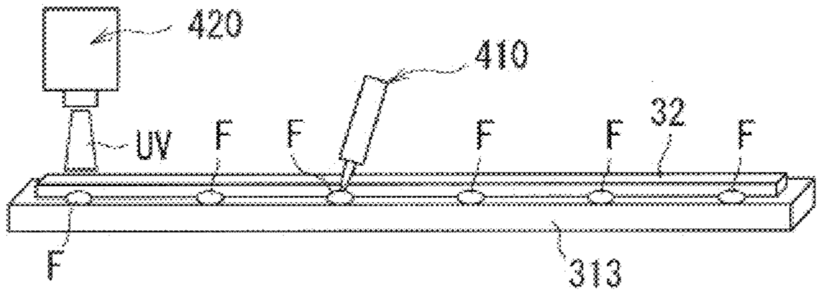
FIG. 13 is a perspective view for explaining an example of a second step of the manufacturing process of the print head.

Next, as illustrated in FIG. 13, after uniformly applying the ultraviolet curing adhesive F to a plurality of locations in a surrounding region between the lens array 32 and the lens holding member 313 by using a dispenser 410, the ultraviolet curing adhesive F is cured by irradiating the ultraviolet curing adhesive F with ultraviolet rays UV by using an ultraviolet irradiation device 420 (second step). Thus, the lens array 32 can be reliably held by the lens holding member 313.

Figure 14:
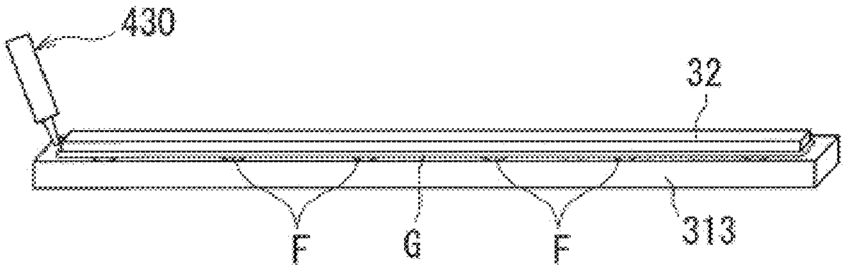
FIG. 14 is a perspective view for explaining an example of a third step of the manufacturing process of the print head.

Next, as illustrated in FIG. 14, a caulking agent G (caulking resin) is applied to the surrounding region between the lens array 32 and the lens holding member 313 by using a caulking agent application device 430, thereby sealing a clearance between the lens array 32 and the lens holding member 313 (third step). This makes it possible to prevent foreign matter such as dust from entering through the clearance between the lens array 32 and the lens holding member 313.

Figure 15:
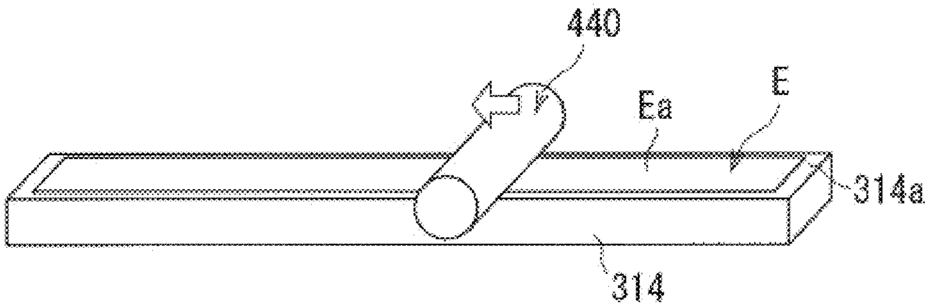
FIG. 15 is a perspective view for explaining an example of a fourth step of the manufacturing process of the print head.

Next, as illustrated in FIG. 15, a roller pressure bonding device 440 is used to attach a double-sided adhesive tape (E) (double-sided pressure-sensitive adhesive sheet) to the surface (314*a*) of the fixing member 314 to which the light-emitting element panel (311) is to be attached, in a state where a protective seal Ea is attached to one surface of the double-sided adhesive tape (E) (fourth step).

Figure 16:
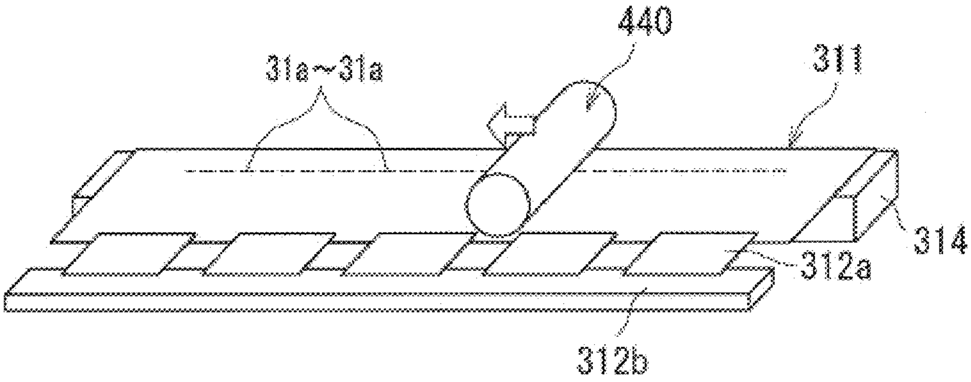
FIG. 16 is a perspective view for explaining an example of a fifth step of the manufacturing process of the print head.

Next, as illustrated in FIG. 16, the protective seal Ea on one surface of the double-sided adhesive tape (E) is peeled off, and the light-emitting element panel (311) is attached to the fixing member 314 by using the roller pressure bonding device 440 in a state where the plurality of light-emitting elements 31-31 in the light-emitting element panel (311) are positioned at reference positioning positions of the fixing member 314 (fifth step).

Figure 17:
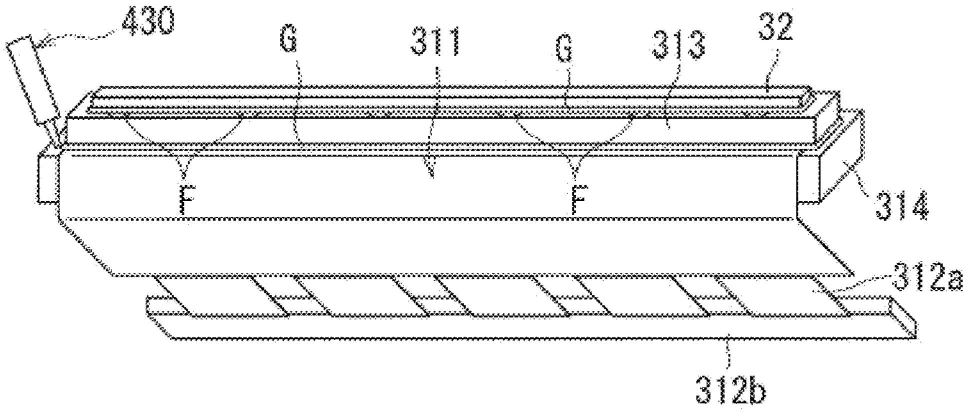
FIG. 17 is a perspective view for explaining an example of a sixth step of the manufacturing process of the print head.

Next, as illustrated in FIG. 17, the lens holding member 313 holding the lens array 32, which is manufactured in the third step (see FIG. 14), is placed on the light-emitting element panel (311) attached to the fixing member 314, and the caulking agent G (caulking resin) is applied to a surrounding region between the lens holding member 313 and the light-emitting element panel (311) by using the caulking agent application device 430, thereby sealing a clearance between the lens holding member 313 and the light-emitting element panel (311) (sixth step). This makes it possible to prevent foreign matter such as dust from entering through the clearance between the lens holding member 313 and the light-emitting element panel (311).

Present Embodiment

As illustrated in FIGS. 9 and 10, the print head 3 according to the present embodiment includes a light-emitting element substrate 311, a lens array 32, and a support member 316 (a fixing member 314 and a main body member 315). The light-emitting element substrate 311 includes a plurality of light-emitting elements 31-31 arranged in a line. In this example, the entire light-emitting element substrate 311 is a film-like light-emitting element panel (flexible panel). In the light-emitting element panel (311), a panel main body 3111 is composed of a flexible material (specifically, polyimide). The plurality of light-emitting elements 31-31 in the light-emitting element substrate 311 emit light for exposing a photosensitive drum 1. The lens array 32 focuses light emitted by the plurality of light-emitting elements 31-31 onto the photosensitive drum 1. The support member 316 supports the light-emitting element panel (311). A film-like protruding portion 317 protrudes from the support member 316.

The support member 316 is provided with a space SP having an opening SPa opened to the outside. The protruding portion 317 is disposed in a state of being bent from the opening SPa of the space SP into the space SP. Herein, as illustrated in FIG. 9, the "space SP" is a region inside a virtual straight line a connecting one edge portion SPa1 of the opening SPa and an other edge portion SPa2 opposed to the one edge portion SPa1 in a cross-sectional view.

In the present embodiment, since the film-like protruding portion 317 is disposed in a state of being bent from the opening SPa of the space SP into the space SP, it is possible to reduce a size of the support member 316 (for example, a size in the optical axis direction N) in a state where the length of the protruding portion 317 is secured, and it is possible to achieve miniaturization of the print head 3 to that extent. In addition, at least a part (a part in this example) of the protruding portion 317 can be accommodated in the space SP from the opening SPa in the support member 316. As a result, damage to the protruding portion 317 due to interference from outside can be suppressed. In this example, the protective member 312*d* is provided so as to face exposed portions of the protruding portions 317 (311*b*, 312*a*). Therefore, the exposed portions of the protruding portions 317 (311*b*, 312*a*) can be reliably protected.

In this embodiment, the light-emitting element substrate 311 is a film-like light-emitting element panel. The protruding portion 317 is a film-like panel portion 311*b* of the light-emitting element panel (311) which protrudes from at least the support member 316 and/or (in this example, and) a film-like connection cable member (312*a*) connected to the light-emitting element panel (311).

With this configuration, the panel portion 311*b* of the light-emitting element substrate 311 which protrudes from at least the support member 316 and/or the film-like connection cable member (312*a*) [in this example, a part of the connection cable member (312*a*)] connected to the light-emitting element substrate 311 can be reliably accommodated in the space SP through the opening SPa of the space SP in the support member 316.

Specifically, the entire light-emitting element panel (311) is formed in a film shape, and is longer than the support member 316 in the width direction M perpendicular to the longitudinal direction L of the print head 3, and/further (in this example, further), the connection cable member (312*a*) is connected to an end portion of the light-emitting element panel (311) on a side opposite to the plurality of light-emitting elements 31-31. In this example, a part of the connection cable member (312*a*) is accommodated in the space SP from the opening SPa. The entire connection cable member (312*a*) is formed in a film shape and is elongated in the width direction M. The film-like connection cable member (312*a*) is a film-like substrate (COF: Chip on Film) on which a semiconductor integrated circuit (specifically, a driver IC) is mounted. The driver IC controls light emission timings of the plurality of light-emitting elements 31-31.

In the present embodiment, the protruding portion 317 is bent along a first inner side surface (315*a*4) on a side of the lens array 32 in the space SP.

With this configuration, the protruding portion 317 accommodated in the space SP can be made as long as possible.

Specifically, the support member 316 includes a fixing member 314 that fixes the light-emitting element substrate 311 and a main body member 315 that holds the fixing member 314. The fixing member 314 fixes a side (N2) opposite to the light emitting side of the light-emitting element substrate 311 in the optical axis direction N. The main body member 315 holds the side (N2) opposite to the light emitting side of the fixing member 314 in the optical axis direction N. Herein, the support member 316 is constituted by two members of the fixing member 314 and the main body member 315, and this is for securing a focal length of the lens array 32 for the plurality of light-emitting elements 31-31. Namely, the fixing member 314 is formed of a material (resin material) capable of ensuring flatness of the surface on the side where the plurality of light-emitting elements 31-31 are provided. On the other hand, the main body member 315 is formed of a material (a resin material which is generally used in many cases) which is less required to have flatness than the fixing member 314. Examples of the material that can be used for the fixing member 314 include a resin material having excellent strength, deformation resistance, rigidity, and heat resistance, such as a resin material having a thermal shrinkage rate smaller than a specified shrinkage rate, and a typical example thereof is a liquid crystal polymer. The material that can be used for the main body member 315 is not particularly limited, and examples thereof include resin materials such as ABS and polycarbonate. The main body member 315 has a curved portion 315*h* which is curved in a convex shape toward one of one side (M1) and the other side M2 in the width direction M (toward the other side M2 in this example). The space SP is provided so as to be deep in a direction intersecting (in this example, perpendicular to) the light-emitting element substrate 311. The protruding portion 317 is bent along the first inner side surface (315*a*4) on the lens array 32 side in the optical axis direction N in the space SP.

In the present embodiment, the first inner side surface (315*a*4) in the space SP is inclined with respect to the light-emitting element substrate 311. Specifically, the first inner side surface (315*a*4) in the space SP is inclined so as to be higher on the opening SPa side and lower on the side opposite to the opening SPa with respect to the light-emitting element substrate 311 in the width direction M.

With this configuration, the protruding portion 317 can be gently bent into the space SP from the opening SPa of the space SP, and damage to the protruding portion 317 due to bending can be suppressed to that extent.

In the present embodiment, the protruding portion 317 is bent in an S shape.

With this configuration, the protruding portion 317 can be efficiently and stably accommodated in the space SP from the opening SPa of the space SP in a state where damage to the protruding portion 317 due to bending is suppressed.

In the present embodiment, the print head 3 further includes a connection substrate (312*b*) [in this example, a rigid connection substrate (312*b*) that is harder than the protruding portion 317] which is connected to an end portion of the protruding portion 317 on the side opposite to the support member. A second inner side surface (315*b*1) on the side opposite to the lens array 32 in the space SP is inclined with respect to the light-emitting element substrate 311. In this example, the second inner side surface (315*b*1) is inclined at an inclination angle greater than an inclination angle of the first inner side surface (315*a*4) with respect to the light-emitting element substrate 311.

The connection substrate (312*b*) is provided along the second inner side surface (315*b*1) without projecting from the space SP.

In this configuration, since the connection substrate (312*b*) is provided along the second inner side surface (315*b*1) inclined with respect to the light-emitting element substrate 311, it is possible to increase the occupied area of the protruding portion 317 in the space SP to that extent. In addition, even when the connection substrate (312*b*) is provided along the second inner side surface (315*b*1), the connection substrate (312*b*) does not project from the inside of the space SP, and thus it is possible to avoid impeding miniaturization of the print head 3.

Moreover, damage to the connection substrate (312*b*) due to interference from the outside can be suppressed.

In this example, the film-like light-emitting element panel (311) and the film-like connection cable member (312*a*), and the film-like connection cable member (312*a*) and the rigid connection substrate (312*b*) are pressure-bonded with an Anisotropic Conducting Film (ACF).

In the present embodiment, a connector terminal (312*b*1) is provided on the connection substrate (312*b*) without projecting from the inside of the space SP.

With this configuration, since the connector terminal (312*b*1) does not project from the inside of the space SP, it is possible to avoid impeding the miniaturization of the print head 3. Moreover, damage to the connector terminal (312*b*1) due to interference from the outside can be suppressed.

In the present embodiment, the connector terminal (312*b*1) is provided along the connection substrate (312*b*).

In this configuration, since the connector terminal (312*b*1) is provided along the connection substrate (312*b*), it is possible to reduce the area of the space SP occupied by the connector terminal (312*b*1) to that extent. In addition, even when the connector terminal (312*b*1) is provided along the connection substrate (312*b*), the connector terminal (312*b*1) does not project from the inside of the space SP, and thus it is possible to avoid impeding the miniaturization of the print head 3.

In the present embodiment, in the space SP, the first inner side surface (315*a*4) on the lens array 32 side and the second inner side surface (315*b*1) on the side opposite to the lens array 32 are bent at an acute angle.

With this configuration, it is possible to achieve miniaturization of the print head 3 in the optical axis direction N.

Herein, when an angle θ (see FIG. 9) formed between the first inner side surface (315*a*4) and the second inner side surface (315*b*1) is too large, miniaturization of the print head 3 in the optical axis direction N is impeded. Therefore, the angle θ formed between the first inner side surface (315*a*4) and the second inner side surface (315*b*1) can be exemplified as 60 degrees or less, preferably 45 degrees or less, and more preferably 30 degrees or less. On the other hand, when the angle θ formed between the first inner side surface (315*a*4) and the second inner side surface (315*b*1) is too small, damage to the protruding portion 317 in the space SP due to bending is caused. Therefore, the angle θ formed between the first inner side surface (315*a*4) and the second inner side surface (315*b*1) may be an angle at which damage to the protruding portion 317 due to bending can be allowed, for example, 10 degrees or more, preferably 20 degrees or more, and more preferably 30 degrees or more. Namely, when a curvature radius of the protruding portion 317 is too large, an increase in the size of the print head 3 is caused, and when the curvature radius is too small, damage to the protruding portion 317 such as disconnection of the wiring is caused.

Therefore, in the present embodiment, the curvature radius of the bending portion of the protruding portion 317 is 30 mm or less, and more preferably 20 mm or less. By doing so, it is possible to avoid an increase in the size of the print head 3. On the other hand, the bending portion of the protruding portion 317 has a curvature radius of 5 mm or more (about 8 mm in this example). In this way, the bending portion of the protruding portion 317 can be gently bent with respect to the support member 316, and accordingly, damage to the bending portion of the protruding portion 317 due to bending can be suppressed to that extent.

In this example, the protruding portion 317 includes the panel portion 311*b* of the light-emitting element substrate 311 which protrudes from at least the support member 316 and the connection cable member (312*a*). Both the panel portion 311*b* and the connection cable member (312*a*) have a bending portion.

In the present embodiment, the protruding portion 317 is held on the inner side surfaces (315*a*4, 315*b*1) in the space SP by a repulsive force due to bending in a state of being bent in the space SP. With this configuration, the protruding portion 317 can be reliably supported in the space SP.

The present disclosure is not limited to the embodiment described above, and can be implemented in various other forms. Therefore, the described embodiments are merely examples in any respects, and should not be interpreted in a limited manner. The scope of the present disclosure is indicated by the appended claims, and is not restricted in any way by the text of the specification. Furthermore, all modifications or changes belonging to the equivalent scope of the claims are within the scope of the present disclosure.

What is claimed is:

1. A print head comprising: a light-emitting element substrate having a plurality of light-emitting elements arranged in a line; a lens array that focuses light emitted by the plurality of light-emitting elements on an image carrier; and a support member that supports the light-emitting element substrate, wherein a film-like protruding portion protrudes from the support member, the support member is provided with a space having an opening opened to outside of the space, and the protruding portion is disposed in a state of being bent from the opening of the space into the space.

2. The print head according to claim 1, wherein the light-emitting element substrate is a film-like light-emitting element panel, and the protruding portion is a panel portion of the light-emitting element panel protruding from at least the support member and/or a film-like connection cable member connected to the light-emitting element panel.

3. The print head according to claim 1, wherein the protruding portion is bent in a state of being along a first inner side surface on a side of the lens array in the space.

4. The print head according to claim 3, wherein the first inner side surface in the space is inclined with respect to the light-emitting element substrate.

5. The print head according to claim 1, wherein the protruding portion is bent in an S shape.

6. The print head according to claim 1, further comprising a connection substrate connected to an end portion of the protruding portion on a side opposite to the support member, wherein a second inner side surface on a side opposite to the lens array in the space is inclined with respect to the light-emitting element substrate, and the connection substrate is provided along the second inner side surface without projecting from inside of the space.

7. The print head according to claim 6, wherein the connection substrate is provided with a connector terminal that does not project from the inside of the space.

8. The print head according to claim 7, wherein the connector terminal is provided along the connection substrate.

9. The print head according to claim 1, wherein the first inner side surface on the side of the lens array and the second inner side surface on the side opposite to the lens array are bent at an acute angle in the space.

10. The print head according to claim 1, wherein a bending portion of the protruding portion has a curvature radius of 6 mm or more.

11. The print head according to claim 1, wherein the protruding portion is held on an inner side surface in the space by a repulsive force due to bending in a state where the protruding portion is bent in the space.

12. An image forming apparatus comprising the print head according to claim 1.

* * * * *